Nov. 21, 1933.  E. R. CANDOR  1,936,377
LUBRICATOR
Filed July 20, 1929  3 Sheets-Sheet 2
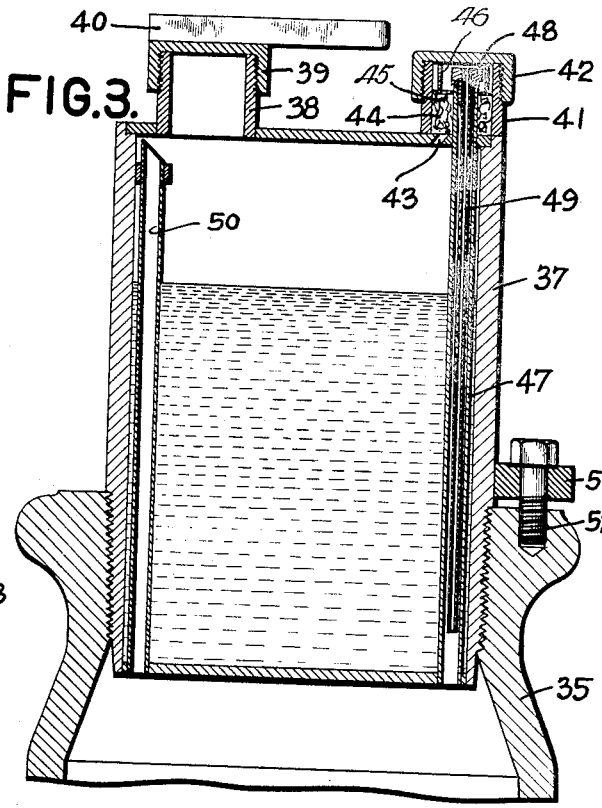
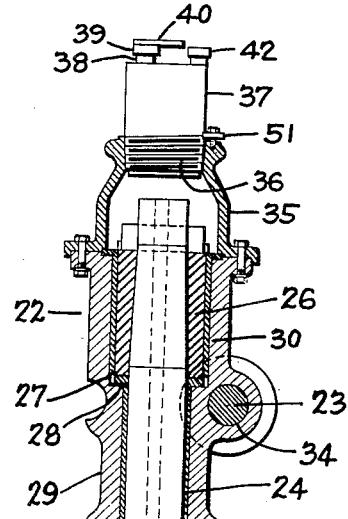
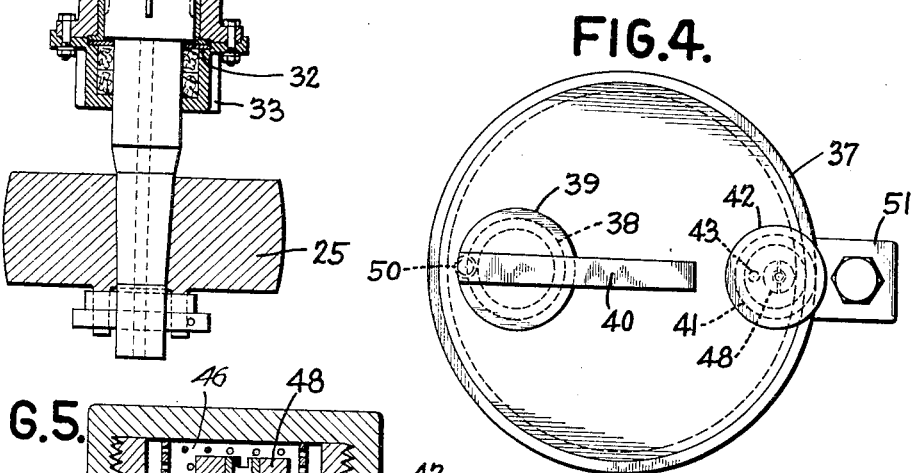
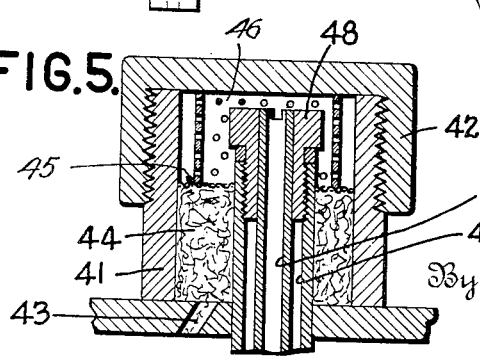
Inventor
Edward R. Candor
By his Attorney
R. J. Dearborn Nov. 21, 1933.  E. R. CANDOR  1,936,377
LUBRICATOR
Filed July 20, 1929  3 Sheets-Sheet 3

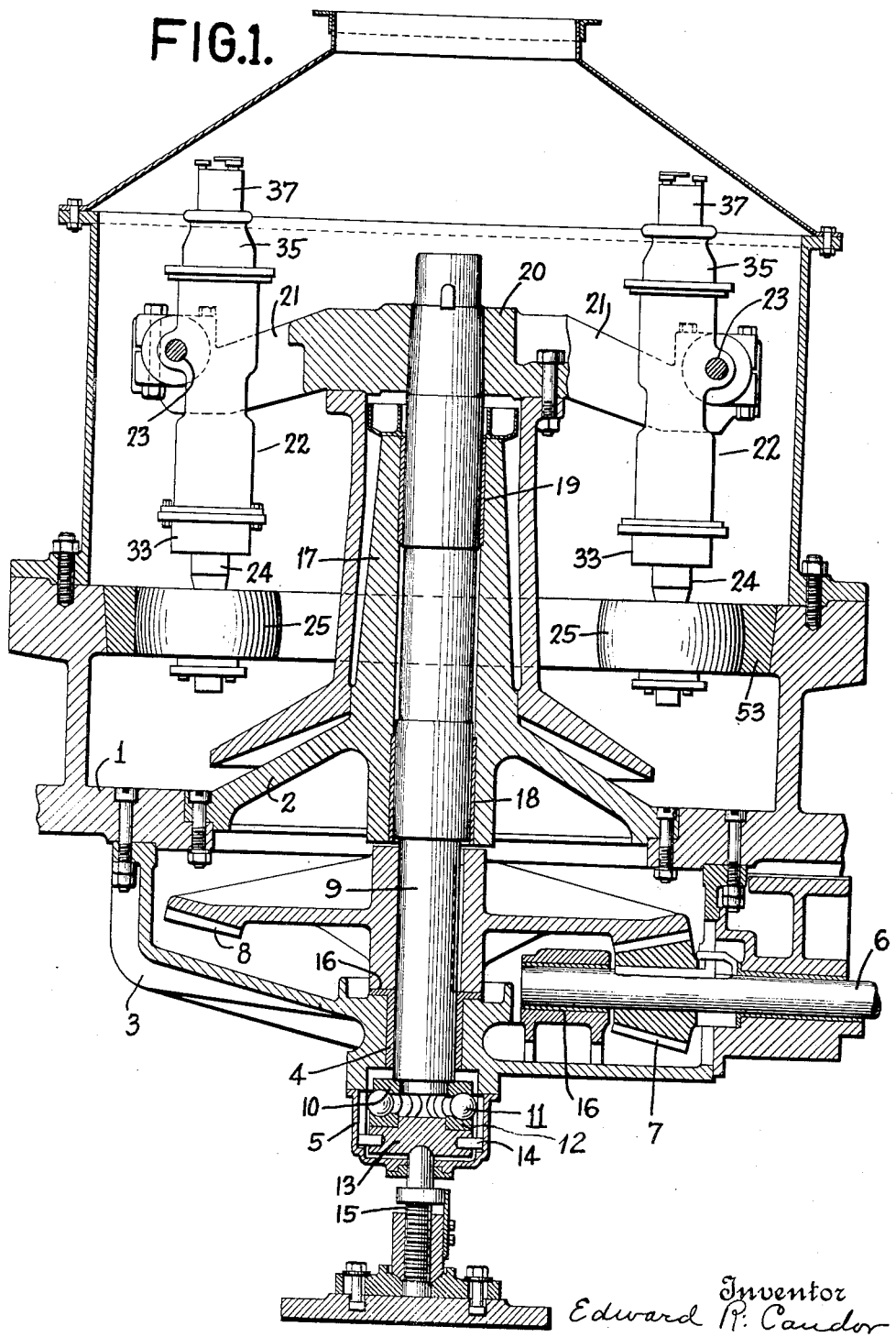

Inventor
Edward R. Candor
By his Attorney
R. J. Dearborn

Patented Nov. 21, 1933

1,936,377

UNITED STATES PATENT OFFICE 1,936,377

LUBRICATOR

Edward R. Candor, Montclair, N. J., assignor to The Texas Company, New York, N. Y., a corporation of Delaware Application July 20, 1929. Serial No. 379,663

16 Claims. (Cl. 184—6)

This invention relates to lubricating devices and more particularly to that class of centrifugal oilers in which it is possible to take advantage of the natural forces and the laws governing the flow of viscous liquids through tubes to control or regulate the flow of the lubricant to the part or parts to be lubricated.

One of the objects of my invention is to provide a device capable of supplying a lubricant to a rotating element such, for example, as a shaft, during the operation thereof and at a rate proportional to the speed of rotation of the rotating element.

Another object of my invention is to provide a device for lubricating a rotating element wherein the lubricant is supplied to the rotating element by the centrifugal force created by the movement of the device.

The invention is capable of various uses but is particularly well adapted for the lubrication of that class of pulverizing mills in which a plurality of crushing rollers is suspended within, and adjacent to, a crushing ring, and in which the rollers are suspended from a spider which is carried by a rotating central shaft, generally referred to as Raymond mills. Accordingly, for the purposes of illustration, I shall describe my invention as applied to a Raymond mill and in the drawings:

Fig. 1 is a vertical sectional view through a machine embodying my invention.

Fig. 2 is an enlarged vertical sectional view through one of the roller-journal boxes of the machine shown in Fig. 1.

Fig. 3 is an enlarged view in vertical section through my improved lubricator.

Fig. 4 is a plan view of the lubricator shown in Fig. 3.

Fig. 5 is an enlarged detail view of a portion of the lubricator.

Figure 6:
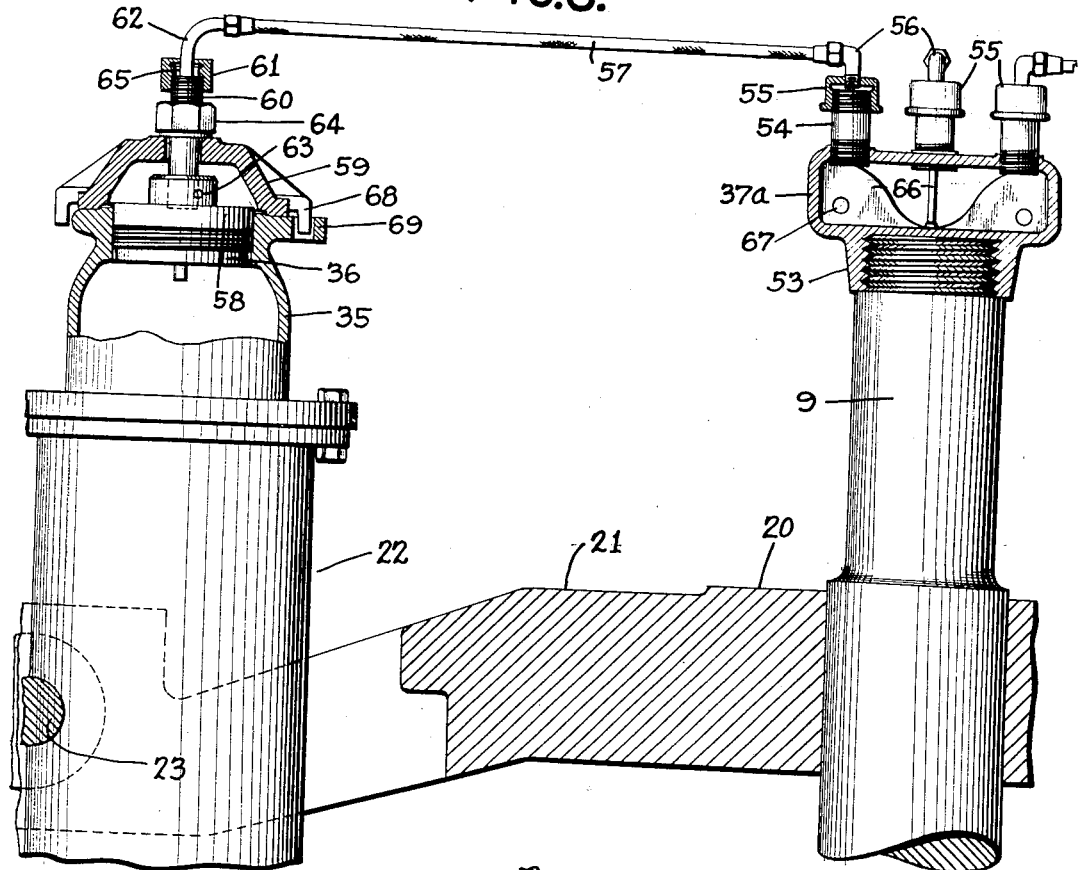
Fig. 6 is a sectional view through a modified form of my invention.

Referring to the accompanying drawings, 1 indicates a bowl or base-ring which may be mounted upon any suitable support or base. Mounted upon an annular shoulder within the base-ring 1 is a base-plate 2, and bolted to the base-ring 1 and base-plate 2 is a casting 3 which carries a bearing 4. Secured to and depending from the lower end of the casting 3 is a step-box 5. Journaled within the casting 3, at one side of the machine, is a drive shaft 6 upon the inner end of which is mounted a gear wheel 7 which meshes with a crown gear 8, which is rigidly secured to the main shaft 9 of the machine. The lower end of the main shaft 9 rests upon a ball race 10 which in turn is supported upon balls 11. The balls are supported upon a race 12 which is mounted upon an annular shoulder within a thrust block 13. Block 13 is formed with a series of peripheral openings each of which is fitted with or carries a pin 14 which extends beyond the periphery of the block with the extended end resting upon an annular shoulder formed within the step-box 5. Block 13 is mounted upon an adjusting screw 15 which extends through the bottom of the step-box 5.

The crown gear 8 rests upon a second thrust bearing 16 which is supported upon an annular flange formed at the upper end of bearing 4. Base-plate 2 is provided with a centrally disposed, upwardly and downwardly extending bearing sleeve 17 which carries bearings 18 and 19 within which the shaft 9 rotates.

A spider 20 is rigidly secured to the upper end of the main shaft 9. The spider comprises a plurality of forked arms 21 within the forks of which are pivotally suspended roller-journal boxes 22 upon trunnions 23. A roller-shaft 24, which carries a crushing roll 25 is mounted within each journal box. Keyed, or otherwise suitably attached, to the upper end of shaft 24 is a bearing sleeve 26 which supports and rotates with the shaft 24. The lower end of the sleeve 26 is supported and rotates upon an end thrust bearing 27 which is mounted within an annular shoulder 28 within the journal casing 29, while the sleeve 26 rotates within a vertical bearing 30 fitted within the upper portion of casing 29.

An additional vertical bearing 31 is provided for a lower enlarged portion of the shaft 24, the bearing resting upon a grease seal ring 32 which is held in position by a stuffing box 33, the latter being bolted to the lower flanged end of housing 29. The roller-journal box 22 is formed with an opening 34 within which is secured the trunnion 23 so that the box is capable of movement in a vertical plane.

A chambered member or housing 35 is secured by means of bolts and nuts to the upper flanged end of casing 29. The housing 35 is formed at its upper end with a threaded opening 36 which in the usual type of roller-journal box, is closed by a threaded plug. Ordinarily this housing is filled with grease which is intended to work its way down around shaft 9 to lubricate the various bearing members.

When the parts are new and form a good working fit the amount of the lubricant working its way downwardly will not ordinarily be excessive, but as the parts wear the natural tendency is for an excess of lubricant to pass downwardly and probably out around the seal ring 32. Furthermore, whether the apparatus is at rest or in operation this movement of grease continues, with a consequent loss and waste of the lubricating material.

In my improved arrangement I eliminate this loss and waste by controlling the supply of lubricant to the shaft and bearings. This I accomplish by eliminating entirely the ordinary threaded plug referred to above as the usual closure for the opening 36. Into the opening 36 I screw an exteriorly threaded and cylindrically shaped chambered member 37 which constitutes an oil reservoir, shown clearly in Figure 2.

The upper end of reservoir 37 is formed with an opening in which a short section of pipe 38 is secured, preferably by welding, to form a filling spout through which the lubricant is poured into the reservoir. The upper end of this pipe is exteriorly threaded to receive a closure member or cap 39 which may, if desired, be provided with a stock 40 for convenience in turning the cap and for preventing it from unscrewing on account of the unbalanced centrifugal force on the stock 40.

A filter chamber 41 is positioned on the upper end of reservoir 37 at a point adjacent the edge thereof and, as in the example illustrated, this chamber may be formed of a short section of pipe secured at one end to the member 37 with its free end threaded to receive a closure member or cap 42. An opening 43 is formed in the upper end of a chambered member 37 to provide for the passage of the lubricant from the reservoir 37 to the filter chamber 41.

The filter chamber is partially filled with a suitable fibrous material 44 such as wool waste or the like to serve as a filter for the lubricant. A wire screen 45 is placed on top of the fibrous material and a perforated spacer ring or tube 46 is interposed between screen 45 and cap 42. With this arrangement the filter material is held in position against the forces acting upon it which would otherwise throw it about and render it less effective as a filter.

A tubular member 47 extends through chambered member 37 with its lower end terminating and secured in a suitable opening in the bottom thereof. The upper end of the tubular member 47 extends through a suitable opening in the top of the chambered member and into filter chamber 41, terminating near the top thereof.

The upper end of the tubular member 47 is interiorly threaded to receive a screw or threaded plug 48 which is drilled to provide an axial bore to receive and hold one end of a tube 49 of smaller diameter than tube 36. Tube 49 is secured in this bore so that when the plug 48 is screwed into position in the upper end of tubular member 47, tube 49 is held within the larger tube 47 and extends nearly to or below the lower end thereof. Tube 49 may be of any size and length, depending upon the character of the lubricant and the rate at which it is necessary to supply the lubricant to the bearings. Interchangeable tubes may be provided for use under different conditions and with different oils, for it is by the use of a tube of the right size that the oil supplied to the bearings is controlled.

An air vent for chambered member 37 is provided in the form of a tube 50 which is secured in an opening in the base of the chambered member and extends nearly to the top thereof, or to a point above the level of the lubricant contained in the chamber. At a point near its upper end, tube 50 is secured to the wall of the chambered member, preferably by welding, in order to prevent it from jarring loose or breaking off during the rotation of the device.

In order to prevent the chambered member 37 from becoming loosened on account of the rotation of the device, a lug 51 is welded to the exterior wall of the member and the lug is provided with an opening through which a bolt 52 extends. A corresponding threaded opening is provided in the upper end of housing 35 and the bolt 52 is adapted to be screwed into this opening to maintain the chambered member 37 in operative position with respect to housing 35.

I have described the details of construction of my device and will now proceed to describe the manner in which it operates.

It is to be understood that the roller-journal box 22 is capable of movement in a vertical plane by reason of the fact that trunnion 23 to which the box is secured is pivotally mounted within one of the forked arms 21 of the spider 20 which is carried by the rotating central shaft 9. As the central shaft 9 is rotated by applying suitable power to driving shaft 6 spider 20 will rotate with it. This rotation of the spider 20 causes the crushing roll 25 to travel around within the crushing ring 53. As the roller-journal box 22 rotates with the spider 20 the centrifugal force imparted to the roll 25 will throw the roll outwardly against the crushing ring 53. The frictional contact between the roll and the ring causes the roll and its shaft 24 to rotate. As the roll 25 and the lower end of the shaft are moved outwardly by centrifugal force, the end of the shaft above the trunnion 23 is moved inwardly, along with the housing 35 and chambered member 37 which is partially filled with a suitable lubricant. When the apparatus is at rest the oil assumes what may be termed a normal level, but in operation centrifugal force will act upon the lubricant in the chambered member and cause some of it to be forced through opening 43 into the filter chamber 41. The continuous force applied to the lubricant forces it through the filtering material 44 and into the open upper end of tube 49 through which it is pushed by centrifugal force and gravity, finally dropping into the housing 35 from which it works its way down around the rotating shaft 24 to lubricate the shaft and its bearings.

Figure 7:
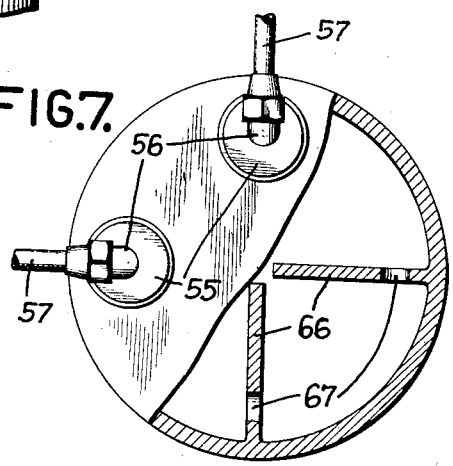
Fig. 7 is an enlarged sectional plan view of a part of the apparatus shown in Fig. 6.

In a slightly modified form of my invention, as illustrated in Figures 6 and 7, a single oil reservoir 37a may be mounted upon the upper end of the main shaft 9, and a plurality of flexible tubes or conduits may connect the reservoir with the several journal box housings 22. In this manner the lubricant is supplied to the several roller shafts and their bearings from a central source.

In this latter embodiment of my invention the upper end of the main shaft 9 is threaded and the single reservoir 37a is formed with a depending annular flange 53 which is interiorly threaded and adapted to be screwed into position upon the threaded end of shaft 9. The top of the reservoir is formed adjacent its outer edge with a plurality of threaded openings into each of which is screwed a short section of pipe 54 corresponding to member 41 of Fig. 3 to form a filter chamber. A threaded cap 55 is screwed on to the upper end of each of the pipes and each cap is formed with a central opening into which is screwed one end of an elbow 56. A flexible tube or conduit 57 is attached to the free end of each elbow and the several conduits connect with the several housings 22 through specially designed closures at the upper ends thereof.

Each housing 22 is provided with a chambered member 35 similar to that used in the form of the invention shown in Fig. 2. The chambered member 35 is formed at its upper end with a threaded opening 36 which is closed by a threaded plug 58. A cover 59 is secured to the upper end of chambered member 35, the cover being formed with one or more lugs 68 which are adapted to engage a corresponding slot or slots 69 in the upper end of the chambered member 35 to prevent rotative movement of the cover and plug 58. The cover 59 and the plug 58 are provided with central openings which are in axial alignment and a tubular member 60 extends through the openings and slightly above the cap 59. The extended end of the tubular member is threaded to receive a closure member 61 which is also formed with a central opening through which either the end of the flexible tube 57, or another tube 62 which is connected to tube 57, extends. Tube 62 corresponds to tube 49 of the construction illustrated in Fig. 3 and may be of any size and length, depending upon the character of the lubricant and the rate at which it is necessary to supply the lubricant to the bearings.

A key 63 extends through registering keyways in plug 58 and tube 60 and prevents any vertical or rotating movement of the tube with respect to the plug. The cap 59 is held in position by a nut 64 on the threaded end of tube 60, the nut simply being turned down with sufficient force to press the cap firmly on its seat.

Suitable packing, preferably in the form of a packing disk 65, is inserted within the cap 61 around tube 62 so that when the cap is screwed down firmly a tight seal is effected.

In this modified form of my invention the reservoir 37a is provided interiorly with a plurality of baffles 66, each of which is formed with one or more openings 67 to permit the oil to attain a uniform level. The baffles are so positioned as to cause the oil to rotate at the same speed as shaft 9 thus positively producing the centrifugal force which drives the oil into the filter chambers 54 and thence through tubes 57 and 62.

When this form of apparatus is employed the rotation of the main shaft 9 causes the reservoir 37a to rotate with it and this rotary movement creates sufficient centrifugal force to discharge the oil into the several filter chambers 54, through the flexible tubes 57 and feed tubes 62 to the several roller journal housings 22. The oil thus supplied in regulated quantities to the housings lubricates the roller shafts and their bearings in the manner already described.

Apparatus of preferred form and construction has been illustrated and described for the purpose of showing a way in which this invention may be practiced, but the inventive thought upon which this application is based is broader than this illustrative embodiment thereof. It is, therefore, understood that the scope of the invention is not to be limited by the present disclosure, reference being had to the appended claims for that purpose.

What I claim is:

1. A lubricator comprising an oil receptacle formed with an opening in the top and adjacent the edge thereof, means for rotating said receptacle to discharge oil by centrifugal force through said opening, and a conduit for conducting the oil forced through said opening to the part to be lubricated.

2. A lubricator comprising an oil receptacle formed with an opening in the upper portion thereof, means for rotating said receptacle to discharge oil by centrifugal force through said opening, and means including a tubular member of restricted diameter for controlling the delivery of the oil forced through said opening to the part to be lubricated.

3. A centrifugal lubricator comprising a chambered member adapted to contain the lubricant, a conduit of restricted diameter having one end thereof disposed above the normal level of the liquid in the chambered member for conducting the lubricant to the part to be lubricated, and means for rotating the chambered member to force the lubricant therein to and through the conduit.

4. A centrifugal lubricator comprising a chambered member adapted to contain the lubricant, a conduit of restricted diameter having one end thereof in open communication with said chambered member at a point above the normal level of the liquid, and means for rotating the chambered member to force the liquid therein to the conduit through which it is conveyed to a part to be lubricated at a point removed from said chambered member.

5. A lubricator comprising an oil reservoir, a chambered member disposed on the upper end of the reservoir and in open communication therewith through an interconnecting port, a tubular member in open communication with the chambered member and extending toward the part to be lubricated, and means for rotating the reservoir to discharge the oil therein by centrifugal force into the chambered member and thence, through the tubular member, to the part to be lubricated.

6. A lubricator comprising an oil reservoir, a filter chamber disposed on the reservoir and in open communication therewith through an interconnecting port, a tubular member in open communication with the filter chamber, means for rotating the reservoir to discharge the oil therein by centrifugal force into the filter chamber and thence to the tubular member, filter material in said filter chamber and means in said chamber for holding the filter material in position during the rotation of the reservoir.

7. A centrifugal lubricator comprising a closed oil reservoir, a chambered member on the upper end of the reservoir near the edge thereof and in open communication therewith through an interconnecting port, a tubular member of restricted diameter extending through the reservoir with one end terminating in the chambered member, and means for rotating the reservoir to discharge the oil therein by centrifugal force through the port and into said tubular member through which it is conveyed in regulated quantities to the part to be lubricated.

8. A lubricator comprising an oil reservoir formed with a discharge opening above the normal level of the oil therein, an oil delivery tube having one end thereof removably secured in said opening, means for rotating said reservoir to discharge the oil therein by centrifugal force to and through said opening and to and through said tube, and means for securing the tube or other like tubes of different sizes interchangeably in said opening.

9. A centrifugal lubricator comprising a closed oil reservoir, a chambered member on the upper end of the reservoir near the outer edge thereof and in open communication therewith through an interconnecting port, a conduit extending into the chambered member and constructed and arranged to be interchanged with other like conduits of different sizes, and means for rotating the reservoir to discharge the oil therein by centrifugal force through the port to the chambered member and thence through the conduit in regulated quantities to the part to be lubricated.

10. In a crushing roller mill having a pivotally mounted journal box and a roller shaft rotatably mounted therein, an oil reservoir mounted in the journal box above the upper end of the shaft, a conduit having one end in open communication with the reservoir above the normal level of the oil therein and the other end in proximity to the roller shaft, and means for operating the mill to discharge the oil in the reservoir by centrifugal force into and through the conduit to the roller shaft.

11. In a crushing roller mill, the combination with a spider, a journal box pivotally suspended from the spider, bearings mounted within the journal box, a roller shaft mounted in said bearings and means for rotating said spider, of means for lubricating said roller shaft and bearings comprising an oil reservoir mounted in the journal box, and a conduit in open communication with said reservoir above the normal level of the oil therein for regulating the supply of oil from the reservoir to the bearings and through which the oil is moved by the centrifugal force created by the rotation of the spider.

12. In a crushing roller mill the combination with a main shaft and means for rotating said shaft, of a spider, a plurality of journal boxes pivotally suspended from said spider, a roller shaft mounted in each of said journal boxes, an oil reservoir mounted on the main shaft, and a plurality of flexible conduits all of which are in open communication with the reservoir above the normal level of the oil therein and severally in communication with one of the journal boxes for delivering the oil forced into the conduits by the centrifugal force created by the rotation of the main shaft, in regulated quantities to the several roller shafts.

13. A lubricator comprising a substantially closed oil reservoir formed with an opening at a point above the normal level of the oil therein, a conduit connecting at one end with said opening and adapted to convey oil from the reservoir towards a part to be lubricated at a point removed from said reservoir, and means for rotating the reservoir about a substantially vertical axis to cause the oil to pass through the conduit to the part to be lubricated.

14. In a crushing roller mill, a pivotally mounted journal box, a roller shaft rotatably mounted therein, an oil reservoir mounted above the upper end of the shaft, a conduit having one end in open communication with the reservoir at a point above the normal level of the oil therein and the other end in proximity to the roller shaft, and means for rotating the mill to discharge the oil in the reservoir by centrifugal force through the conduit to the roller shaft.

15. In a crushing roller mill, a pivotally mounted journal box, a roller shaft rotatably mounted therein, an oil reservoir mounted above the upper end of the shaft and formed with an opening at a point above the normal level of the oil therein, means communicating with said opening for conducting oil from the reservoir to the shaft in regulated quantities, and means for rotating the mill to force the oil by centrifugal action through said conducting means.

16. In a crushing roller mill, the combination with a spider, a journal box pivotally suspended from the spider, a roller shaft mounted in the journal box, and means for rotating said spider, of means for lubricating said roller shaft comprising an oil reservoir mounted near the upper end of the journal box and formed with a discharge opening above the normal level of the oil therein, an oil delivery tube having one end thereof removably secured in said opening for conducting oil discharged from said reservoir by centrifugal force to a part to be lubricated during the rotation of the spider, and means for securing the said tube and other like tubes of different sizes interchangeably in said opening.

EDWARD R. CANDOR.